US008774158B2

(12) United States Patent
Avital et al.

(10) Patent No.: US 8,774,158 B2
(45) Date of Patent: Jul. 8, 2014

(54) METHOD AND APPARATUS TO SHORTEN THE DURATION OF INITIAL NETWORK SELECTION AND HANDOVER DECISIONS IN MULTICOMM PLATFORMS BY UTILIZING ALTERNATE FRAGMENTED SCANNING

(75) Inventors: Shlomo M. Avital, Jerusalem (IL); Miri Ratner, Ramat Gan (IL)

(73) Assignee: Intel Corporation, Santa Clara, CA (US)

( * ) Notice: Subject to any disclaimer, the term of this patent is extended or adjusted under 35 U.S.C. 154(b) by 290 days.

(21) Appl. No.: 12/874,480

(22) Filed: Sep. 2, 2010

(65) Prior Publication Data

US 2012/0057564 A1  Mar. 8, 2012

(51) Int. Cl.
*H04W 74/04* (2009.01)
*H04W 84/12* (2009.01)
*H04B 7/26* (2006.01)

(52) U.S. Cl.
CPC .............. *H04W 74/04* (2013.01); *H04W 84/12* (2013.01); *H04B 7/2656* (2013.01)
USPC ........... 370/347; 370/331; 370/328; 455/434; 455/435.1

(58) Field of Classification Search
CPC ..... H04W 74/04; H04W 88/08; H04W 84/12; H04B 7/2656; H04B 7/2643
USPC .......................... 370/328–347, 465–466, 252; 455/434–435.1; 375/132
See application file for complete search history.

(56) References Cited

U.S. PATENT DOCUMENTS

| | | | | |
|---|---|---|---|---|
| 6,134,445 | A * | 10/2000 | Gould et al. | 455/456.3 |
| 2005/0249128 | A1 * | 11/2005 | Mekkittikul et al. | 370/252 |
| 2007/0275746 | A1 | 11/2007 | Bitran | |
| 2008/0205377 | A1 * | 8/2008 | Chao et al. | 370/351 |
| 2008/0273575 | A1 * | 11/2008 | Rayzman et al. | 375/132 |
| 2009/0103496 | A1 | 4/2009 | Purkayastha et al. | |
| 2009/0198804 | A1 | 8/2009 | Danforth et al. | |
| 2009/0274121 | A1 * | 11/2009 | Bertorelle et al. | 370/331 |

FOREIGN PATENT DOCUMENTS

| WO | 2012/030478 A2 | 3/2012 |
|---|---|---|
| WO | 20121030478 A3 | 4/2012 |

OTHER PUBLICATIONS

International Search Report and Written Opinion received for PCT application No. PCT/US2011/046892, mailed on Feb. 29, 2012, 9 Pages.
International Preliminary Report on Patentability and Written Opinion Received for PCT Patent Application No. PCT US2011/046892 mailed on Mar. 14, 2013, 6 pages.

* cited by examiner

*Primary Examiner* — Ian N Moore
*Assistant Examiner* — Hien Nguyen
(74) *Attorney, Agent, or Firm* — Thorpe North & Western LLP

(57) ABSTRACT

An embodiment of the present invention provides an apparatus, comprising a network adapter capable of combining more than one wireless communication technology (comm) for wireless communication in a wireless network, wherein the apparatus includes a network detection phase implemented by doing a full scan of one comm followed by one or more additional comm scans; and wherein the network adapter breaks a scan into buckets, and alternates between different scanning buckets of different comms to provide faster scanning, connection time and handover from one wireless technology to another wireless technology.

19 Claims, 2 Drawing Sheets

METHOD AND APPARATUS TO SHORTEN THE DURATION OF INITIAL NETWORK SELECTION AND HANDOVER DECISIONS IN MULTICOMM PLATFORMS BY UTILIZING ALTERNATE FRAGMENTED SCANNING

BACKGROUND

Wireless networks are now pervasive and vital in society. Wireless networks may transmit and receive information utilizing varying techniques.

A wireless multicomm device is a network adapter that combines more than one wireless technology (each wireless technology may be referred to herein and to those or ordinary skill in the art as a 'comm'). The different wireless comms might share some of the hardware components on the device (such as radio, antennas etc). Sharing hardware components might limit the usage of the device in a way that at a given time only one of the wireless comms can use the hardware to transmit or receive. Additionally, for multicomm devices that do not have shared hardware components, non-coordinated transmissions or receptions may cause interference to the co-located comm. Power saving is yet another reason why one might want to avoid turning ON both comms simultaneously (regardless if the comms share hardware or not).

In current multicomm solutions, the common practice is to perform a full scanning cycle on one technology (COM1), and only when exhausted, moving to next technology (COM2). It is understood that more than two technologies may be implanted. This might result in very long initial connection time for COM2 in single network environment. Current wireless comm implementations are optimized for single comm environments; hence, when loosing network connections, the comm device engages in intensive scanning efforts, assuming there is no other communication alternative available. Thus the decision on handover (and the handover itself) might be significantly delayed.

Consequently, there is a strong need in the wireless communication industry for a method and apparatus to shorten the duration of initial network selection and handover decisions in multicomm platforms

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
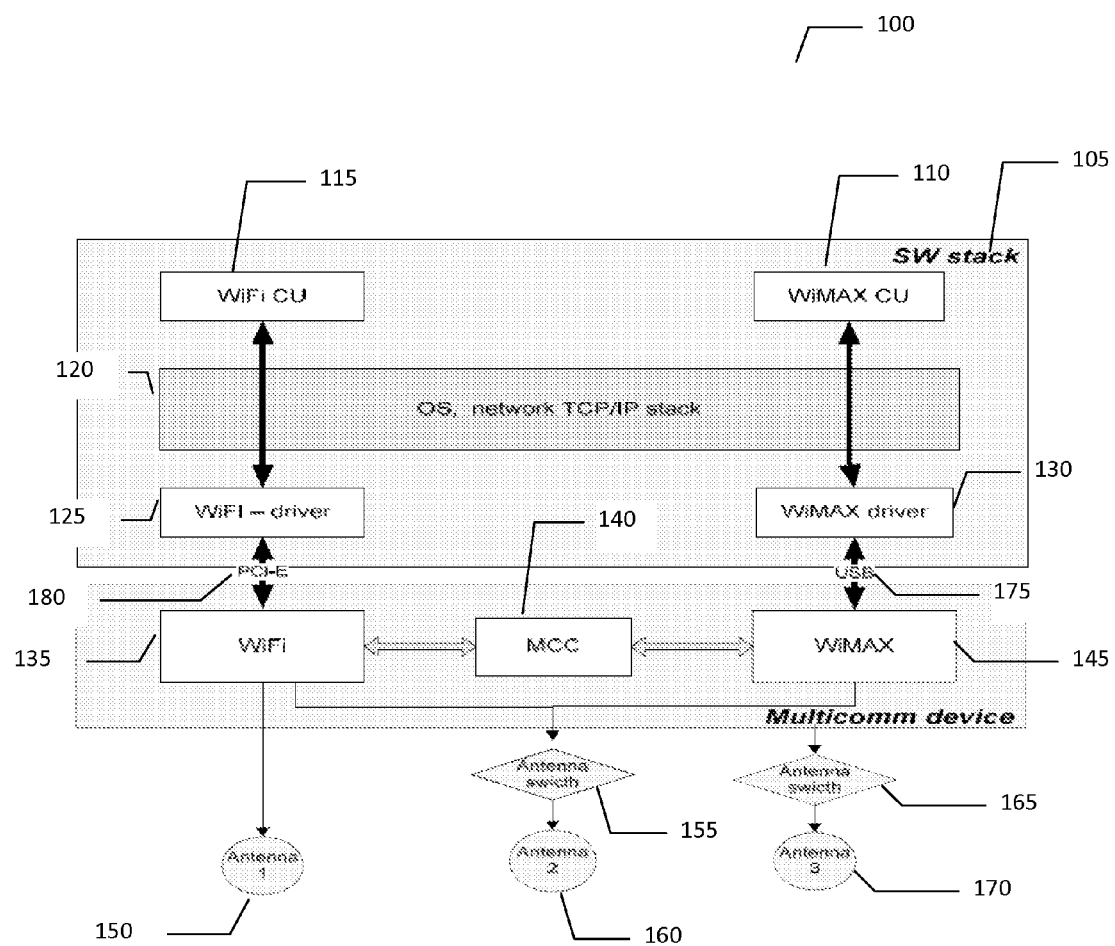
FIG. 1 illustrates an example of WiFi-WiMAX Multicomm device according to embodiments of the present invention.

It will be appreciated that for simplicity and clarity of illustration, elements illustrated in the figures have not necessarily been drawn to scale. For example, the dimensions of some of the elements are exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of the invention. However, it will be understood by those skilled in the art that the preset invention may be practiced without these specific details. In other instances, well-known methods, procedures, components and circuits have not been described in detail so as not to obscure the present invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. For example, "a plurality of stations" may include two or more stations.

Embodiments of the present invention provide techniques to significantly shorten the inter-networks detection phase (also referred to herein as scanning) on multicomm devices both in initial network selection and in "break before make" handover scenarios. Embodiments of the present invention may treat the "scanning" of a comm not as monolithic block, but instead it may break the scanning into buckets, and alternate between different scanning buckets of different comms to provide faster scanning, connection time and handover of multicomm devices As set forth above, a wireless multicomm device is a network adapter that combines more than one wireless technology. The different wireless comms might share some of the hardware components on the device (such as radio, antennas etc) and sharing hardware components might limit the usage of the device in a way that at a given time only one of the wireless comms can use the hardware to transmit or receive.

Looking now at FIG. 1, shown generally as 100, is an example of a multicomm device. In this example, the multicomm is composed of WiFi 135 and WiMAX 145 technologies, and the hardware (HW) blocks been shared are the antennas 150, 160 and 170, but the device can share other components like RF chains, Front Ends etc. Antenna 2 160 is shown connected via antenna switch 155 and antenna 3 170 is shown connected via antenna switch 165. It is understood that although embodiments of the present invention exemplify the use of wireless comm technologies that conform to the Institute for Electronic and Electrical Engineering (IEEE) 802.11 standard (also referred to as WiFi) and those that conform to the Institute for Electronic and Electrical Engineering (IEEE) 802.16 standard (also referred to as WiMAX), it is understood that the present invention is not limited to these standards and may also apply to any number of comms and technologies in a multicomm device.

The wireless multicomm device may have an additional control entity (e.g. an additional hardware or software stack 105 that may reside in the host, multicomm device or both) which is used to coordinate the operation of the different comms. This entity is referred herein as a "MultiComm Controller"—MCC 140. Software stack 105 may include WiMAX Connection Utility—CU 110, WiFi CU 115, OS, network TCP/IP stack 120 and WiFi driver 125 and WiMAX driver 130. It is noted that the MCC can be an additional SW thread running on one of the comms; some of the MCC functionality might reside in the host. A USB Host Interface 175 may connect WiMAX driver 130 to WiMAX 145 and a PCI-E 180 may be used to connect WiFi driver 125 and WiFi 135—although the present invention is not limited in this respect.

In a single Comm environment, where there is an available network, it will be detected relatively fast (e.g. by looking for access points (APs) that were discovered in recent previous scans). However if there is no such network, it will take the comm a long time to come to this conclusion, by scanning all the channels. The network detection phase/scanning on typical multicomm devices is usually implemented by doing a full scan of one comm followed by another comm scan. Thus, in a multicomm environment, if the preferred network is not available, the connection time with the other comm is significantly long, as the device first tries to connect to the preferred comm.

Figure 2:
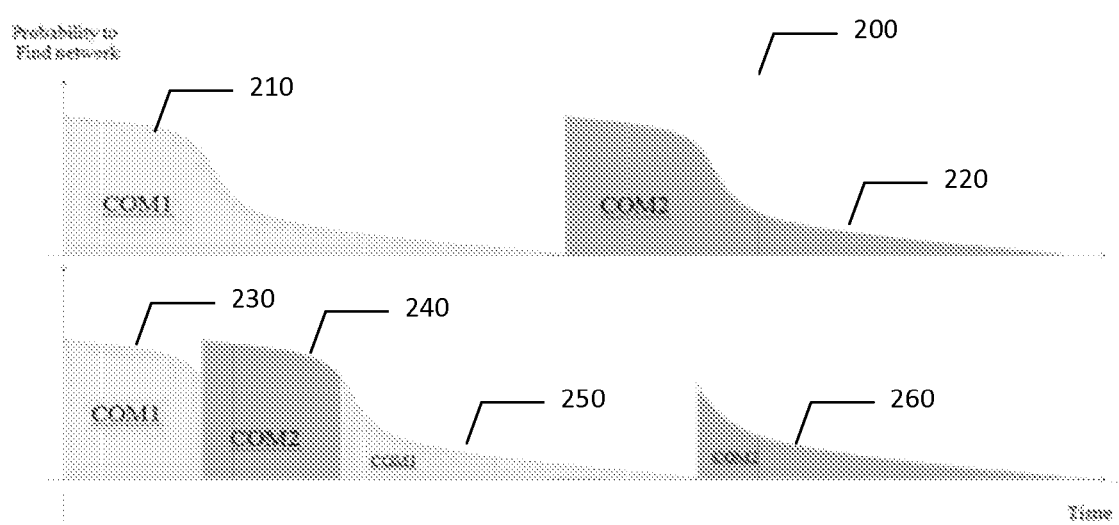
FIG. 2 shows the probability of finding a network according to embodiments of the present invention.

In embodiments of the present invention, each comm shall fragment its scanning to buckets B[comm][i] (where 'comm' is {WiFi,WiMAX}, i>1); such that when executing B[comm],[i] there is a chance of X[comm][i] percent to successfully find a network in the shortest time possible.(X[comm],[i]<=X[comm], [i+1]; chances of X[i+1] assumes X[i] was executed). Examples are: WiFi doing active scan on B[wifi],[i] and moving to passive channels on B[wifi], [i+1], WiMAX scans for recently found network, and it's known neighbors on B[wimax],[i] And move to other channels on B[wimax],[i+1]. In embodiments of the present invention, the Multicomm device then performs a TDM based scanning in the following pattern: B[comm1][1], B[comm2][l1], B[comm1][2], B[comm2][2], B[comm1][3], B[comm2][3], etc. until a network is found (optionally the comms can complete the scan after association that follows the network detection as shown in FIG. 2 at 200, which provides the probability of finding a network according to embodiments of the present invention. This is graphically illustrated as probability to find a network vs. time. Com1 is shown as 210 and com2 220 for previous methods and com1 230, com2 240, com1 250 and com2 260 according to the present invention.

Typically, the chances of finding a network during the first scanning buckets (B[wifi],[1], B[wimax],[1]) are high. Thus, scanning duration, and the applicable power consumption, will be decreased significantly, in most used cases.

It is noted that bucket definition can be changed dynamically, based on various criteria. For example in "Handover scanning" the first bucket of the current comm will be significantly longer. The reason for that is that moving to different network has a penalty in the upper layers (DHCP, IP change etc). Another reason can be user preference to certain network type (performance, cost), which can make its buckets more exhaustive. The bucket definition can also be based on location information in embodiments of the present invention.

Yet another embodiment of the present invention provides a method to shorten the duration of initial network selection and handover decision in multicomm platforms, comprising utilizing alternate fragmented scanning for platforms that combine more than one wireless communication technology (comm) for wireless communication in a wireless network and includes a network detection phase implemented by doing a full scan of one comm followed by one or more additional comm scans and wherein said scanning is broken into buckets, and alternates between different scanning buckets of different comms.

In embodiments of the present invention each comm may fragment its scanning of said buckets, B, $B_{[comm][i]}$ (i>1); such that when executing $B_{[comm],[i]}$ there is a chance of $X_{[comm][i]}$ percent to successfully find a network in the shortest time possible, and then performs time-division multiplexing (TDM) based scanning in the following pattern: $B_{[comm][1]}$, $B_{[comm][l1]}$ $B_{[comm1][2]}$, $B_{[comm2][2]}$, $B_{[comm1][3]}$, $B_{[comm2][3]}$, and continued until a network is found.

Yet another embodiment of the present invention may provide a computer readable medium encoded with computer executable instructions, which when accessed, cause a machine to perform operations comprising shortening the duration of initial network selection and handover decision in multicomm platforms, by utilizing alternate fragmented scanning for platforms that combine more than one wireless communication technology (comm) for wireless communication in a wireless network and includes a network detection phase implemented by doing a full scan of one comm followed by one or more additional comm scans, and wherein said scanning is broken into buckets, and alternates between different scanning buckets of different comms.

Still other embodiments of the present invention may provide a wireless multicomm device, comprising, a network adapter capable of combining more than one wireless communication technology (comm) for wireless communication in a wireless network, wherein said wireless multicomm includes a network detection phase implemented by doing a full scan of one comm followed by one or more additional comm scans, and wherein said network adapter breaks a scan into buckets, and alternates between different scanning buckets of different comms to provide faster scanning, connection time and handover from one comm to another comm.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

We claim:

1. An apparatus, comprising:
   a network adapter capable of combining more than one wireless communication technology (comm) for wireless communication in a wireless network;
   wherein said apparatus includes a network detection phase to select an available network by performing a network selection scan of at least a first comm and a second comm until a network is found;
   wherein said network adapter breaks the network selection scan of at least a first comm and a second comm into scanning buckets, and alternates network selection scanning between scanning buckets of the first comm and the second comm to reduce a time of finding at least one of the comms;
   wherein each comm fragments the comm's network selection scanning to scanning buckets, B, B[comm][i] (i>1); such that when executing B[comm],[i] there is a chance of X[comm][i] percent to successfully find a network in the shortest time possible; and
   wherein said apparatus then performs time-division multiplexing (TDM) based network selection scanning in the following pattern: B[comm1][1], B[comm2][l1], B[comm1][2], B[comm2][2], B[comm1][3], B[comm2][3], and continued until a network is found.

2. The apparatus of claim 1, wherein a bucket definition can be changed dynamically, based on determined criteria.

3. The apparatus of claim 2, wherein said scanning bucket definition is based on location information.

4. The apparatus of claim 1, wherein said more than one wireless communication technologies (comm) is two wireless comms and one of said two wireless comms is a WiFi communication and one of said two wireless comms is a WiMAX communication.

5. The apparatus of claim 4, wherein said more than one wireless comm share hardware blocks and wherein said hardware blocks include one or more of the following: antennas, RF chains, or Front Ends.

6. The apparatus of claim 4, further comprising a Multi-Comm Controller (MCC) that is an additional control used to coordinate the operation of the different comms.

7. The apparatus of claim 6, where said MCC is a software stack that includes a WiMAX Connection Utility, WiFi Connection Utility, OS, network TCP/IP stack, a WiFi driver and a WiMAX driver.

8. The apparatus of claim 7, wherein said MCC is an additional SW thread running on one of said comms and wherein some of said MCC functionality resides in a host.

9. A method to shorten the duration of initial network selection and handover decision in multicomm platforms, comprising:
utilizing alternate fragmented network selection scanning for platforms that combine more than one wireless communication technology (comm) for wireless communication in a wireless network and includes a network detection phase to select an available network by performing a network selection scan of at least a first comm and a second comm until an initial network is found;
wherein said network selection scanning is broken into buckets, and alternates network selection scanning between scanning buckets of the first comm and the second comm to reduce a time of finding at least one of the first and second comms; and
wherein each comm fragments the comm's network selection scanning said scanning buckets, B, B[comm][i] (i>1); such that when executing B[comm],[i] there is a chance of X[comm][i] percent to successfully find a network in the shortest time possible, and then performs time-division multiplexing (TDM) based network selection scanning in the following pattern: B[comm1][1], B[comm2]|1], B[comm1][2], B[comm2][2], B[comm1][3], B[comm2][3], and continued until a network is found.

10. The method of claim 9, wherein a scanning bucket definition can be changed dynamically, based on determined criteria.

11. The method of claim 10, wherein said scanning bucket definition is based on location information.

12. The method of claim 9, wherein said more than one wireless communication technologies (comm) is two wireless comms and one of said two wireless comms uses WiFi communication and one of said two wireless comms uses WiMAX communication.

13. The method of claim 12, wherein said more than one wireless comm share hardware blocks and wherein said hardware blocks include one or more of the following: antennas, RF chains, or Front Ends.

14. A non-transitory computer readable medium encoded with computer executable instructions, which when accessed, cause a machine to perform operations comprising:
shortening the duration of initial network selection and handover decision in multicomm platforms, by utilizing alternate fragmented network selection scanning for platforms that combine more than one wireless communication technology (comm) for wireless communication in a wireless network and includes a network detection phase to select an available network by performing a network selection scan of at least a first comm and a second comm until a network is found;
wherein said network selection scanning is broken into scanning buckets, and alternates network selection scanning between scanning buckets of the first comm and scanning buckets of the second comm to reduce a time of finding at least one of the first and second comms; and
wherein each comm fragments the comm's network selection scanning said scanning buckets, B, B[comm][i] (i>1); such that when executing B[comm],[i] there is a chance of X[comm][i] percent to successfully find a network in the shortest time possible, and then performs time-division multiplexing (TDM) based network selection scanning in the following pattern: B[comm1][1], B[comm2]|1], B[comm1][2], B[comm2][2], B[comm1][3], B[comm2][3], and continued until a network is found.

15. The non-transitory computer readable medium encoded with computer executable instructions of claim 14, wherein a scanning bucket definition can be changed dynamically, based on determined criteria.

16. The non-transitory computer readable medium encoded with computer executable instructions of claim 15, wherein said scanning bucket definition is based on location information.

17. The non-transitory computer readable medium encoded with computer executable instructions of claim 14, wherein said more than one wireless communication technologies (comm) is two wireless comms and one of said two wireless comms is a WiFi communication and one of said two wireless comms is a WiMAX communication.

18. The non-transitory computer readable medium encoded with computer executable instructions of claim 17, wherein said more than one wireless comm share hardware blocks and wherein said hardware blocks include one or more of the following: antennas, RF chains, or Front Ends.

19. A wireless multicomm device, comprising:
a network adapter capable of combining more than one wireless communication technology (comm) for wireless communication in a wireless network;
wherein said wireless multicomm includes a network detection phase to selecting an available network by performing a network selection scan of at least a first comm and a second comm until a network is found;
wherein said network adapter breaks the network selection scan into scanning buckets during the network detection phase, and alternates network selection scanning between scanning buckets of the first comm and the second comm to reduce a time of finding at least one of the comms; and
wherein each comm fragments the comm's network selection scanning to scanning buckets, B, B[comm][i] (i>1); such that when executing B[comm],[i] there is a chance of X[comm][i] percent to successfully find a network in the shortest time possible; and
wherein said wireless multicomm device then performs time-division multiplexing (TDM) based network selection scanning in the following pattern: B[comm1][1], B[comm2]|1], B[comm1][2], B[comm2][2], B[comm1][3], B[comm2][3], and continued until a network is found.

* * * * *